March 8, 1955 — M. WAGNER — 2,703,709
LINKAGE, IN PARTICULAR FOR THE GUIDE
LINKS OF A WHEEL SUSPENSION
Filed Sept. 13, 1949
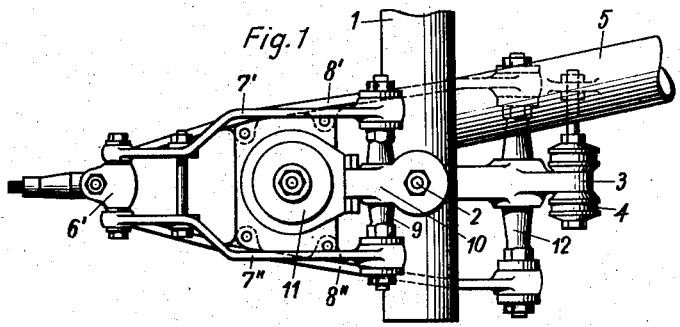
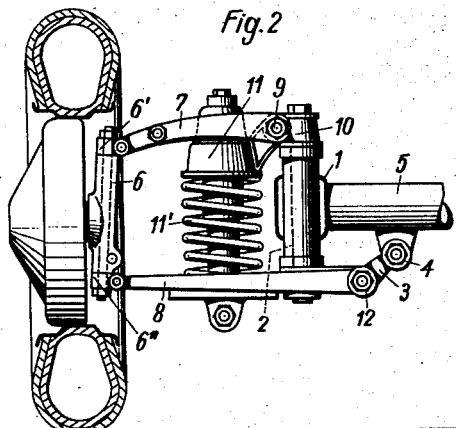
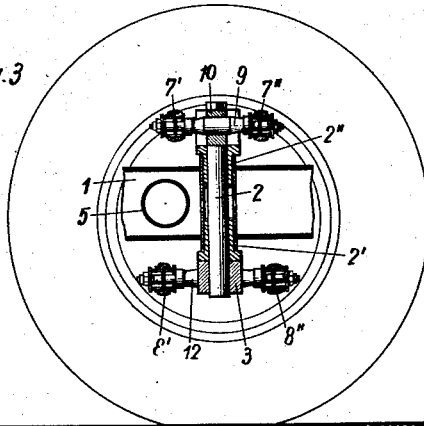
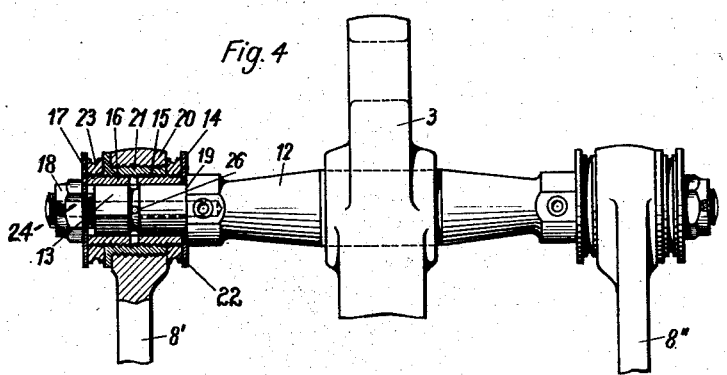
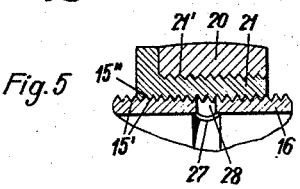
INVENTOR
Max Wagner United States Patent Office 2,703,709
Patented Mar. 8, 1955

2,703,709

LINKAGE, IN PARTICULAR FOR THE GUIDE LINKS OF A WHEEL SUSPENSION

Max Wagner, Stuttgart, Germany, assignor to Daimler-Benz Aktiengesellschaft, Stuttgart-Unterturkheim, Germany Application September 13, 1949, Serial No. 115,403

Claims priority, application Germany May 7, 1949

13 Claims. (Cl. 267—20)

The present invention relates to a linkage, and more particularly to a bearing provided on a bearing pin for oscillating link members, preferably for guide links of a wheel suspension which swing to and fro, as used especially with independently guided wheels of motor vehicles.

A primary object and essential characteristic of the present invention consists in that a bearing thread serves as bearing surface for movably linked parts, such as, for example, the guide links on a bearing pin.

Another object and characteristic of the present invention is that a relative swinging motion takes place between the internal and external threads of the bearing, while the internal as well as the external threads are arranged in separate sleeves.

A further object of the present invention is the provision of a threaded bearing which facilitates the manufacture and interchangeability of the thread thereof, and which is rendered possible independently of the link members to be connected.

Moreover, another object and characteristic of the present invention resides in the provision of a threaded bearing wherein the thread, which serves as cooperative bearing for the link members is sealed on both ends of the thread against the outside thereof by appropriate sealing means. Elastic sealing rings, for example, of rubber or rubber-like material are suitable as sealing means. The sealing rings are suitably supported axially by shoulder-like parts and are preferably under compression. For the purpose of increasing the elasticity thereof, the sealing rings may be provided with grooves. On the one hand, a tight seal for effective lubrication is thereby assured and, on the other hand, noises within the linkage are avoided. The link parts can swing relatively of each other in the thread since the minor relative motion caused thereby is elastically taken up by the yielding or elastic characteristics of the sealing means. At the same time the links are protected from dirt.

In the application of the present invention to the wheel guiding system of a vehicle, such as, for example, a motor vehicle, which uses, by way of example, two guide links arranged one upon another, it is appropriate that each of the guide links be supported by links or bearings made in conformity with the present invention and sealed at both ends thereof. In case the two guide links consist of two link arms, then the bearing of the present invention is suitably applicable to both link arms. The ends of a bearing pin may serve as bearing for both link arms which bearing pin is preferably placed or inserted into a carrier piece which itself is yieldingly supported around a perpendicular fulcrum axis or is supported by another supporting member.

Further objects, characteristics and advantages of the present invention will become more obvious from the following description when taken in connection with the accompanying drawing which shows for purposes of illustration only one embodiment of the present invention, and wherein:

Figure 1 is a plan view of a wheel guide in accordance with the present invention.

Figure 2 is a side elevational view of the wheel guide of Figure 1.

Figure 3 is a cross-sectional view taken through the fulcrum axis of Figure 1.

Figure 4 is a longitudinal sectional view through the bearing support of one of the link arms in accordance with the present invention, and Figure 5 is an enlarged cross-sectional view showing in greater detail a portion of Figure 4.

Referring now to the drawing, wherein like reference numerals are used throughout the various views to designate like parts, and which shows an embodiment of the present invention in its application to a wheel guide having two guide links disposed one upon another, reference numeral 1 designates a frame member which is mounted on a carrier or supporting pin 2 of the wheel suspension. The pin 2 is elastically supported in the frame member 1 by rubber buffers 2' and 2". The carrier or supporting pin 2 is provided with an inwardly directed arm 3 which in turn is supported in a suitable manner by rubber buffers 4 against the transverse member 5 of the frame 1.

The wheel support or carrier member 6 of, for example, a front steerable wheel, is guided by an upper guide link 7 consisting of bifurcated or link arms 7' and 7" and by a lower guide link 8 consisting of bifurcated or link arms 8' and 8" in the manner of a quadrangle or trapezoid. The wheel support 6 is linked to guide links 7 and 8 respectively by means of joints 6' and 6". The upper guide link 7 is pivotally mounted on a transverse pin 9 which is placed into an end piece 10. The pin 9 and end piece 10 are preferably made of one integral piece.

The end piece 10 rests on the perpendicular supporting pin 2 and simultaneously supports the bell-shaped upper spring support 11 for helical spring 11'. The lower guide link 8 is pivotally mounted in a similar manner on a transverse pin 12 which may be placed or inserted into the lower arm 3 of the perpendicular supporting pin 2.

The particular arrangement of the bearing support for the guide arms 7' and 7" respectively on the upper transverse pin 9, and for the guide arms 8' and 8" respectively on the lower transverse pin 12 is shown in Figure 3 which, by way of example, illustrates in longitudinal section the bearing arrangement of the guide arm 8' on the transverse pin 12.

The transverse pin 12, which is secured to the arm 3 of the perpendicular bearing pin 2, is provided at the outer ends thereof with reduced diametric portions forming a bearing pin 13. A plurality of parts, namely a disk 14, a sleeve 16 which is provided with an external thread 15', and another disk 17 are mounted on bearing pin 13, whereby these parts are supported against the shoulder 19 of the transverse pin 12 and are held together by means of a nut 18 which is in threaded engagement with the externally threaded end of the bearing pin 12.

The thread 15' of the sleeve 16 serves as a bearing for the guide arm 8' which is provided with an eye 20 into which a sleeve 21 is threadably secured in such a way that the flange thereof rests on the front or outside face of eye 20. The sleeve 21 is provided with an internal thread 15", which corresponds to the external thread 15' on sleeve 16. The sleeve 21 is further suitably secured in the eye 20 so that the sleeve 21 swings together with the eye 20 and, consequently, with the guide link 8 about the bearing pin 13 of transverse pin 12, whereby the external thread 15" threadably engages the thread 15' of the sleeve 16 which in turn is fastened to bearing pin 13. In this connection, the external thread of the sleeve 21 is developed to have the same pitch as the threads 15' and 15", and may, for example, be developed as special thread with a shallow depth.

Rubber rings 22 and 23 serve to seal both ends of the bearing thread 15' and 15". These rings 22 and 23 abut, on the one hand, against the sleeve 21 and, on the other hand, against the disks 14 and 17 which are used as shoulder-like abutment parts. In order to increase the elasticity of the rings 22 and 23, they are provided with annular grooves. It is to be noted that the rings 22 and 23 are under compression or initial tension, while the sleeve 16 effectively forms a spacer and thereby establishes the minimum distance between the disks 14 and 17 so as to prevent excessive compression of the rubber rings 22 and 23 by the nut 18.

For purpose of lubrication of the thread 15, the bearing pin 13 is provided with a longitudinal central bore 24 into which the lubricant may enter through a connecting member 25. The lubricant may be supplied to the connecting member 25 through a conventional lubricating nipple or through appropriate connections with the centralized lubrication system of the vehicle. The oil flows or circulates from the longitudinal bore 24 to the thread 15 through a transverse bore 26, through an annular groove 27 of the bearing pin 13 and also through transverse bores 28 of the sleeve 16.

By the use of special separate sleeves 16 and 21, the bearing means 15 formed by threads 15' and 15'' can be easily and quickly interchanged. In a given case, however, one of the sleeves 16 or 21 or both of them may be omitted by providing the thread directly on the bearing pin 12 or the guide link 8'. In that case, however, it cannot be avoided to partially or entirely forego the particular interchangeability feature offered by the threads 15' and 15'', as described above.

The disk 14, for example, may also be omitted in an arrangement where the rubber ring 22 supports itself directly against the shoulder 19, or against another shoulder-like part of the bearing pin 12. The rubber rings 22 and 23 always assure a tight seal of the bearing thread 15, even though the guide arm 8' is subjected to a minor axial displacement during the swinging motion thereof on the thread 15'.

In a manner similar to the linkage of the link arms with the frame or with the carrier piece 2, the same linkage of the link arms may also be provided with the wheel carrier 6 or with the joints 6' and 6''.

In a given case, the linkage or connection of the guide links on the sides thereof towards the frame may take place by means of special separate threaded sleeves while the linkage at the end thereof towards the wheel may be without such sleeves, as described above.

Although only one form of the present invention has been illustrated and described in detail, it will be apparent to those skilled in the art that various modifications may be made without departing from the scope of the appended claims.

What is claimed is:

1. In a wheel suspension for a vehicle, a pin-like member, an eye member enclosing said pin-like member at a certain radial distance thereof, a pair of concentric bearing sleeves between said pin-like member and said eye member within the radial interspace between said two members, the inner one of said sleeves being fixedly connected with said pin-like member for common rotation therewith and being provided with an external thread, and the other outer sleeve being connected with said eye member for common rotation therewith and being provided with an internal thread, both of said sleeves being in relative threaded engagement by means of said two threads whereby the swinging motion of said eye member relative to said pin-like member and the relative motion takes place within the threads of said inner and outer sleeves respectively, said pin-like member being provided at one end thereof with a shoulder against which said inner sleeve is axially supported, a removable shoulder-like part which supports itself axially against the other end of said inner sleeve, means axially compressing said inner sleeve against said shoulder by means of said removable shoulder-like part, and sealing means between the outer sleeve and said shoulder and shoulder-like part for sealing both ends of said cooperating threads.

2. A linkage according to claim 1, wherein said inner sleeve is secured to said pin-like member, and said outer sleeve is in threaded engagement with said eye-like member.

3. A linkage according to claim 1, further comprising at least one lubrication duct provided in said pin-like member, said duct being in communication with the inside of said threads which serve as bearing.

4. A linkage according to claim 1, wherein said sealing means are formed by elastic sealing rings which are made of elastic material, said sealing rings being provided with furrows in order to increase their elasticity.

5. A linkage according to claim 1, wherein one of said sleeves is connected with the corresponding member by means of a further thread which has the same pitch as the bearing thread so that it can be screwed into the other of said sleeves without relative axial movement of said two members.

6. A linkage according to claim 1, wherein one of said sleeves is connected with the corresponding member by means of a further thread which has the same pitch as the bearing thread, said further thread being of lower depth than the threads serving as the bearing, so that it can be screwed into the other of said sleeves without relative axial movement of said two members, said one sleeve having a shoulder engaging a shoulder on said corresponding member.

7. A linkage comprising a pin-like link member, an eye link member, said eye link member enclosing said pin-like member, threading means intermediate said members connecting the same by cooperating threads therein and comprising at least one removable sleeve with one of said cooperating threads, and connected with one of said link members, a pair of shoulder-like members on the link member connected with said sleeve, at least one of said shoulder-like parts being axially shiftable, said sleeve being enclosed axially between said shoulder-like parts, sealing rings on both ends of said threads between said shoulder-like parts and the link member not connected with said sleeve, and means for pressing said shoulder-like parts axially towards each other in order to compress said sealing rings whereby said shoulder-like parts are kept at a certain minimum distance from each other.

8. A wheel suspension according to claim 7, further comprising a bi-partite guide link consisting of two separate link arms, each arm including an eye link member mounted separately on the ends of said pin-like link member, and means connecting together said two link arms.

9. In a wheel suspension for a vehicle, a pin-like member, an eye member enclosing said pin-like member at a certain radial distance thereof, a pair of concentric bearing sleeves between said pin-like member and said eye member within the radial interspace between said two members, the inner one of said sleeves being fixedly connected with said pin-like member for common rotation therewith and being provided with an external thread, and the other outer sleeve being connected with said eye member for common rotation therewith and being provided with an internal thread, both of said sleeves being in relative threaded engagement by means of said two threads whereby the swinging motion of said eye member relative to said pin-like member and the relative motion takes place within the threads of said inner and outer sleeves respectively, said pin-like member on its one end being provided with a shoulder against which said inner sleeve is axially supported, a removable shoulder-like part which supports itself axially against the other end of said inner sleeve, means axially compressing said inner sleeve against said shoulder by means of said removable shoulder-like part, thread means on said outer sleeve and said eye member connecting together said outer sleeve and said eye member, a shoulder on said outer sleeve adapted to abut against a cooperating shoulder face on said eye member when threaded into said eye member, and sealing means for sealing both ends of said cooperating threads each abutting on one side thereof against said first-named shoulder and said shoulder like part respectively and on the other side thereof against the end faces of said outer sleeve.

10. In a wheel suspension for vehicles, the combination comprising a vehicle superstructure, a carrier piece supported on the vehicle superstructure, an essentially horizontal unitary pin-like bearing member supported by said carrier piece, a bifurcated guide link having two arms for guiding the wheel in an elastic up and down motion relative to the vehicle superstructure, both arms of said guide link being supported on the ends of said pin-like bearing member, an eye member for each of said arms enclosing said pin-like member with predetermined radial interspace therebetween, two cooperatively seated bearing sleeves between said pin-like and said eye members within the radial interspace between said two parts, the inner one of said sleeves being removably connected with said pin-like part for common rotation therewith and being provided with an external thread, the other outer sleeve being removably connected with said eye member for common rotation therewith and being provided with an internal thread, and both of said sleeves being in threaded engagement by means of said threads, the swinging of said link members upon said bearing member and the relative movement taking place within said threads of said inner and outer sleeves respectively.

11. A wheel suspension according to claim 10, in which said outer sleeve is removably connected to said eye by an outer thread of the same pitch as the inner thread.

12. A wheel suspension according to claim 10, further comprising elastic packing means at the ends of the threads serving for the support, and disengageable means for axially pre-tensioning said packing means.

13. A linkage comprising a pin-like link member, an eye link member, said eye link member enclosing said pin-like member, mutually engaging threaded sleeves intermediate said members connecting the same by co-operating threads therein and extending over an axial distance greater than said eye link member, a pair of shoulder-like parts on said pin-like link member, at least one of said shoulder-like parts being axially shiftable, one of said sleeves being axially enclosed between said shoulder-like parts, sealing rings placed over both ends of said one sleeve between said shoulder-like parts and said eye link members, and means for pressing said shoulder-like parts axially towards each other in order to compress said sealing rings whereby said one sleeve forms a spacer and said shoulder-like parts are kept at a certain minimum distance from each other.

References Cited in the file of this patent

UNITED STATES PATENTS

| | | |
|---|---|---|
| 1,685,005 | Robertson | Sept. 18, 1928 |
| 2,069,781 | Skillman et al. | Feb. 9, 1937 |
| 2,148,177 | Sherman | Feb. 21, 1939 |
| 2,190,298 | Slack | Feb. 13, 1940 |
| 2,198,680 | Slack | Apr. 30, 1940 |
| 2,305,802 | Balz | Dec. 28, 1942 |
| 2,321,832 | Leighton | June 15, 1943 |
| 2,338,478 | Wulff | Jan. 4, 1944 |

FOREIGN PATENTS

| | | |
|---|---|---|
| 119,498 | Great Britain | Sept. 27, 1918 |
| 252,016 | Great Britain | May 7, 1926 |